US011650144B2

(12) United States Patent
Tsai et al.

(10) Patent No.: US 11,650,144 B2
(45) Date of Patent: May 16, 2023

(54) INTERDIGITATED CAPACITIVE SENSOR FOR REAL-TIME MONITORING OF SUB-MICRON AND NANOSCALE PARTICULATE MATTERS

(71) Applicants: Colorado State University Research Foundation, Fort Collins, CO (US); Purdue Research Foundation, West Lafayette, IN (US)

(72) Inventors: Su-Jung (Candace) Tsai, Fort Collins, CO (US); Doosan Back, Seoul (KR); David B. Janes, West Lafayette, IN (US)

(73) Assignees: Colorado State University Research Foundation, Fort Collins, CO (US); Purdue Research Foundation, West Lafayette, IN (US)

( * ) Notice: Subject to any disclaimer, the term of this patent is extended or adjusted under 35 U.S.C. 154(b) by 178 days.

(21) Appl. No.: 17/173,877

(22) Filed: Feb. 11, 2021

(65) Prior Publication Data

US 2021/0247290 A1 Aug. 12, 2021

Related U.S. Application Data

(60) Provisional application No. 62/972,988, filed on Feb. 11, 2020.

(51) Int. Cl.
*G01N 15/06* (2006.01)
*G01N 15/00* (2006.01)
(Continued)

(52) U.S. Cl.
CPC ......... *G01N 15/10* (2013.01); *G01N 15/0606* (2013.01); *G01N 15/0656* (2013.01);
(Continued)

(58) Field of Classification Search
CPC .......... G01N 15/0606; G01N 15/0656; G01N 2015/0046
See application file for complete search history.

(56) References Cited

U.S. PATENT DOCUMENTS

| 2010/0180668 A1* | 7/2010 | Kruse | G01N 15/0656 73/28.01 |
| 2012/0059598 A1* | 3/2012 | Yokoi | G01N 15/0656 702/24 |

(Continued)

*Primary Examiner* — Paul M. West
(74) *Attorney, Agent, or Firm* — Polsinelli PC

(57) ABSTRACT

Aspects of the present disclosure involve systems, methods, and the like, for a fabrication of a particulate matter (PM) sensor that utilizes a capacitance sensor to detect sub-micrometer and nanoparticles in the respirable range of an environment. In one implementation, the capacitance sensor may comprise interdigitated electrodes between which a capacitance may be measured. PM deposited on the sensor may cause the capacitance between the electrodes to be altered and such a change in capacitance may be measured by the PM sensor. This measurement of the change in capacitance of the interdigitated capacitance sensor may therefore be correlated to the presence of sub-micrometer and nanoparticles in an environment. In one particular implementation, the PM sensor may further include a micro-heater circuit, a readout circuit, and an interface connecting the readout circuit to the micro-heater/capacitance sensor of the PM sensor.

19 Claims, 9 Drawing Sheets
(4 of 9 Drawing Sheet(s) Filed in Color)

(51) Int. Cl.
 _G01N 15/10_ (2006.01)
 *G01N 15/12* (2006.01)

(52) U.S. Cl.
 CPC ............... *G01N 2015/0038* (2013.01); *G01N 2015/0046* (2013.01); *G01N 2015/1087* (2013.01); *G01N 2015/1254* (2013.01)

(56) References Cited

U.S. PATENT DOCUMENTS

2012/0103059 A1* 5/2012 Kimata .............. G01N 15/0656
　　　　　　　　　　　　　　　　　　　　　29/25.42
2017/0365531 A1* 12/2017 Tedeschi .............. G01D 5/2405
2020/0193258 A1* 6/2020 Hawwa ................... H02S 50/00

\* cited by examiner

INTERDIGITATED CAPACITIVE SENSOR FOR REAL-TIME MONITORING OF SUB-MICRON AND NANOSCALE PARTICULATE MATTERS

CROSS-REFERENCE TO RELATED APPLICATION

This application is related to and claims priority under 35 U.S.C. § 119(e) from U.S. Patent Application No. 62/972,988, filed Feb. 11, 2020 entitled "Interdigitated Capacitive Sensor for Real-time Monitoring of Sub-micron and Nanoscale Particulate Matters," the entire contents of which is incorporated herein by reference for all purposes.

TECHNICAL FIELD

Embodiments of the present invention generally relate to systems and methods for monitoring of environmental conditions, and more particularly, to systems and methods for real-time monitoring of sub-micron and/or nanoscale particle particulate matters (PM) in an environment.

BACKGROUND

Particulate matter (PM) is a mixture of particles and droplets in air consisting of various compounds. PM exists everywhere in various sizes, although some of the particles may be toxic and respirable to human. Some work environments have more dangerous respirable particles than others and can cause harmful effects to human through inhalation. For example, miners in a mining environment are often exposed to higher level of hazardous particles such as coal, silica (SiO2) and diesel exhaust. Continuous exposure to such particles can cause severe damage to the human respiratory system. For instance, exposure to mine dust can cause coal workers' pneumoconiosis (CWP), also known as black lung disease, which is very common in coal miners. Workers mining minerals are often at a high risk for silicosis as they are exposed to mine dust containing high amount of silica. Accordingly, the National Institute for Occupational Safety and Health (NIOSH) recommends that workers' exposure to respirable coal mine dust should be limited to 1 mg/m$^3$ and crystalline silica should be limited to 0.05 mg/m$^3$ (up to 10 hours per day over a 40-hour work week). Recently, Mine Safety and Health Administration (MSHA) lowered the concentration limit of respirable coal mine dust from 1 mg/m$^3$ to 0.5 mg/m$^3$ for underground and surface coal mines.

Devices have been commercially developed to monitor air quality or collect airborne particles in the mining environments. In one approach known as gravimetric sampling, a personal sampler including a cyclone, filter holder, and a small pump is worn by workers to obtain samples of the environment. The concentration of dust is calculated by the average mass gain over the sampling time which is then analyzed via electron microscopy and x-ray diffraction spectroscopy (XPS) to examine the accurate concentration and components of the collected particles, such as silica. However, the gravimetric sampling approach typically requires several hours to collect the particles and send them out for analysis. Other approaches include direct reading of particle concentrations through various monitoring techniques. For example, a light scattering method to measure size distribution of PM in real time has been developed to monitor PM concentrations by translating the sampler's light scattering into the corresponding concentration. In another example, some monitors utilize a tapered-element oscillation microbalance (TEOM) approach to monitor the coal-dust concentration in the mining environment. In general, TEOM devices include a replaceable filter cartridge mounted to the tip of the tapered element which oscillates like a tuning fork during operation. The oscillation frequency changes in real-time with respect to the mass collected on the filter and the integrated particle mass can be analyzed by gravimetric method after measurement.

Further, recent research has demonstrated that nanoparticles (NPs) have stronger and unique adverse health effects compared to micrometer-sized particles of the same material. For example, particle deposition efficiency in the human respiratory track has been measured to vary with particle diameter; while the highest efficiency (~90%) is at particle diameter of 10 µm and reduces to 15% with decreased diameter, the efficiency starts increasing again when the diameter is 0.2 µm. The efficiency reaches almost 80% with particle diameter of ~0.01 µm. Moreover, such particles can penetrate deep into the lung or other organs by circulating through the body. To prevent such adverse health effects, accurate characterization of NP exposure in an environment is needed. However, due to the smaller volume of particles as well as their smaller mass, detecting sub-micron and nanoparticles using current methods is challenging since it requires orders of magnitude higher sensitivity compared to detecting microscale particles. In parallel, there is an effort to change the mass-based regulation to number of NPs for accurate evaluations. While a number of government agencies and private entities have established mass-based occupational exposure limits (OELs) for carbon nanotubes (CNTs), one type of nanomaterial, some agencies have started to rely on number of concentrations.

Commercially available PM sensors are not yet developed to detect ultra-fine particles from noisy environment. For instance, the use of some monitors is inhibited in gassy underground mines as it is impacted by moisture in the mine air and calibration using gravimetric measurement is necessary. Therefore, it is not recommended for environments where accuracy is the topmost concern. In addition, TEOM monitors may not be suitable for monitoring nanomaterials in the mining environment as mine dust contains a portion of respirable particles in nanometer sizes as well as in microscale. However, current devices are mainly affected by larger particles while the response from smaller particles are masked by the response of the larger particles.

It is with these observations in mind, among others, that aspects of the present disclosure were conceived.

SUMMARY

One aspect of the present disclosure relates to a particulate matters sensing device comprising a sensor cartridge and a readout circuit. The sensor cartridge may include an interdigitated capacitance sensor comprising a plurality of interdigitated electrodes, each of the plurality of interdigitated electrodes separated from another of the plurality of interdigitated electrodes by a spacing, wherein sub-micron or nanoscale particular matters (PMs) of an environment are deposited within the spacing. The readout circuit may include a processor and a tangible storage medium encoded with instructions that are executed by the processor to perform operations of a method. The operations may include receiving a measurement signal corresponding to a capacitance of the interdigitated capacitance sensor, correlating the capacitance of the interdigitated capacitance sensor to a concentration of the deposited sub-micron or nanoscale PMs of the environment, and displaying an indication of the concentration of the deposited sub-micron or nanoscale PMs of the environment.

In some instances, the sensor cartridge may further include a micro-heater circuit generating heat for the sensor cartridge and the readout circuit may further include a display device such that the method may also include displaying the indication of the concentration of the deposited sub-micron or nanoscale PMs of the environment on the display device. The readout circuit may further including a wireless communication unit receiving the indication of the concentration of the deposited sub-micron or nanoscale PMs of the environment and transmitting the indication via the wireless transmitter.

In other instances, a width of at least one of the plurality of electrodes of the particulate matters sensing device may be between 10 nm to 3 μm and a width of the spacing may be between 10 nm to 3 μm. The sensor cartridge may further comprise a flexible, printed circuit board comprising a first conductive path electrically connected to a first portion of the plurality of interdigitated electrodes and a second conductive path electrically connected to a second portion of the plurality of interdigitated electrodes. The sensor cartridge may also include a resistor connected in series with the interdigitated capacitance sensor, the resistor and interdigitated capacitance sensor comprising a resistor-capacitor (RC) circuit. In such instances, the method may include the operations of transmitting a monitoring signal to the RC circuit, the RC circuit providing an output signal comprising a delay of the monitoring signal, the delay corresponding to the capacitance of the interdigitated capacitance sensor of the RC circuit and comparing a delay of the measurement signal to the monitoring signal to determine the capacitance of the interdigitated capacitance sensor.

In still other instances, the indication of the concentration of the deposited sub-micron or nanoscale PMs of the environment comprises at least one of an auditory alarm, a tactile alarm, or a visual alarm.

Another aspect of the present disclosure relates to a method for monitoring particulate matters of an environment. The method may include the operations of locating a sensor cartridge in a sampling cassette, the sensor cartridge comprising an interdigitated capacitance sensor comprising a plurality of interdigitated electrodes, each of the plurality of interdigitated electrodes separated from another of the plurality of interdigitated electrodes by a spacing, determining, at a monitoring circuit, a capacitance of the interdigitated capacitance sensor, the capacitance corresponding to a concentration of deposited sub-micron or nanoscale PMs of the environment on the spacing of the interdigitated capacitance sensor, and displaying, on a display device, an indication of the concentration of the deposited sub-micron or nanoscale PMs of the environment on the spacing of the interdigitated capacitance sensor.

The method may also include the operations of receiving a measurement signal comprising a delay of the monitor signal, the delay corresponding to the capacitance of the interdigitated capacitance sensor, determining a number of output pulses of the measurement signal with a duration equal to or more than a minimum duration value, and correlating the number of output pulses of the measurement signal to the concentration of deposited sub-micron or nanoscale PMs of the environment on the spacing of the interdigitated capacitance sensor.

BRIEF DESCRIPTION OF THE DRAWINGS

The patent application file contains at least one drawing executed in color. Copies of this patent or patent application publication with color drawing(s) will be provided by the Office upon request and payment of necessary fee.

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Aspects of the present disclosure involve systems, methods, and the like, for a fabrication of a particulate matter (PM) sensor that utilizes a capacitance sensor to detect sub-micrometer and nanoparticles in the respirable range of an environment. In one implementation, the capacitance sensor may comprise interdigitated electrodes between which a capacitance may be measured. PM deposited on the sensor may cause the capacitance between the electrodes to be altered and such a change in capacitance may be measured by the PM sensor. This measurement of the change in capacitance of the interdigitated capacitance sensor may therefore be correlated to the presence of sub-micrometer and nanoparticles in an environment.

In one particular implementation, the PM sensor may further include a micro-heater circuit, a readout circuit, and an interface connecting the readout circuit to the micro-heater/capacitance sensor of the PM sensor. The interdigitated capacitance sensor may have a detection capability of sub-micron and nanoscale particles in 1 mm×1.5 mm sensing area. This miniaturized sensor enables an easy integration with standard sampling cassettes minimizing the interference of air flow for particle collection. The readout circuit may utilize, in one implementation, a resistance-capacitance (RC) delay time constant to monitor capacitance shift due to particle deposition in real-time and may be is separately designed for re-use. The capacitance sensor may mounted on a personal sampler and located away from center to increase the probability of accepting sub-micron particles while rejecting larger particles. The PM sensor is tested and provides a clear response with respect to particle deposition; and the positive capacitance shift is consistent with the increased sensor counting. The micro-heater allows the sensor temperature to be maintained at constant temperature above dew point for stable sensor reading. In this manner, a sensor comprising an interdigitated capacitor may be used to detect sub-micrometer and nanoparticles in the respirable range of an environment as a continuous particle monitoring device.

Figure 1:
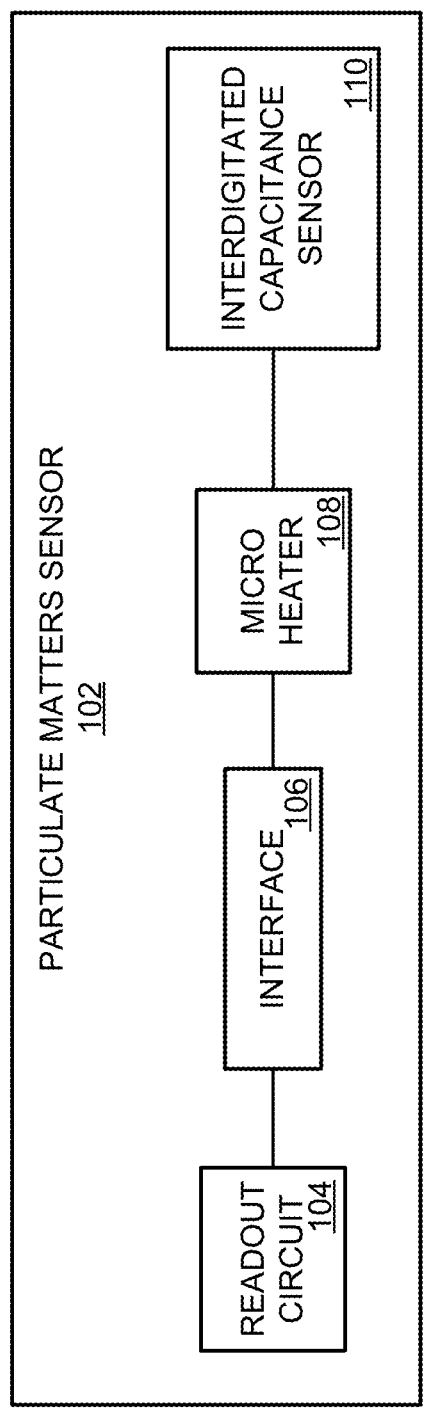
FIG. 1 is a block diagram of a particulate matters sensor for real-time monitoring of sub-micron and nanoscale particulate matters in accordance with one embodiment.

Turning first to FIG. 1, a block diagram of a particulate matters (PM) sensor 102 for real-time monitoring of sub-micron and nanoscale PMs in accordance with one embodiment in shown. In some instances, the capacitance sensor 102 may include a readout circuit 104, an interface 106, a micro-heater 108, and an interdigitated capacitance sensor 110. Although shown as including the above-noted components, more or fewer components or circuits may be included with or in communication with the PM sensor 102. For example, the PM sensor 102 may be in communication with a warning system to alert a wearer of the sensor of a particular level of sensed sub-micron and nanoscale PMs. In another implementation, one or more components of the PM sensor 102 may be in communication with a wired or wireless transmitter configured to transmit a measurement of PMs determined by the PM sensor 102. Such measurements may be transmitted to a mobile device, a computing device, or a network device to further analysis and processing by the receiving device. Further, although illustrated in FIG. 1 as interconnected in a particular construction, each of the components of the PM sensor 102 may be connected to or otherwise communicate with any other component of the sensor. A more detailed description of the components, circuits, systems, and/or portions of the PM sensor 102 is discussed in more detail below.

Figure 2:
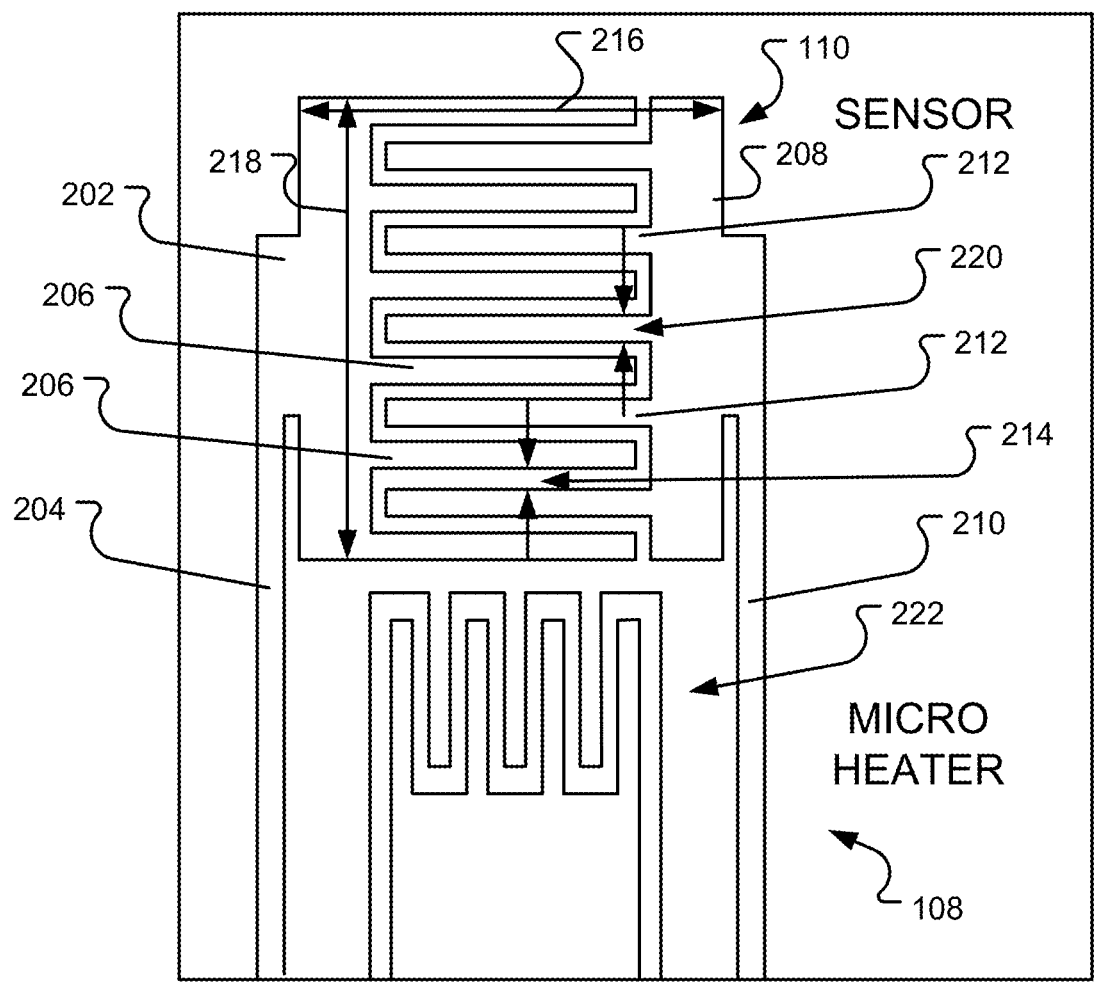
FIG. 2 illustrates an example interdigitated capacitance sensor 110 for use with a particular matters sensor 102 to monitoring for sub-micron and nanoscale particular matters in an environment in accordance with one embodiment.

As shown in FIG. 1, the PM sensor 102 may include an interdigitated capacitance sensor 110 for detecting a change in capacitance. In general, an interdigitated capacitance sensor 110 may include a multi-fingered, micro-strip electrodes interdigitated on a substrate board, such as that illustrated in FIG. 2. In particular, FIG. 2 illustrates an example interdigitated capacitance sensor 110 for use with a PM sensor 102 to monitoring for sub-micron and nanoscale PMs in an environment, in accordance with one embodiment. The capacitance sensor 110 includes a first conductor plate 202 in electrical communication with a first electrical lead 204. A plurality of first electrodes 206 extend from the first conductor plate 202 with a space between each of the plurality of first electrodes. A second conductor plate 208 is located opposite the first conductor plate 202 and is connected to or otherwise in electrical communication with a second electrical lead 210. A plurality of second electrodes 212 extend from the second conductor plate 208 with a space between each of the plurality of second electrodes. The plurality of first electrodes 206 and the plurality of second electrodes 212 are interdigitated such that one of the first electrodes is located within the space between two of the second electrodes, and vice versa. In one implementation, the leads, conductor plates, and electrodes of the capacitance sensor 110 may be constructed from copper or other conducting metal. During use, a capacitance may occur across the narrow gap between the electrodes 206, 212 (shown in FIG. 1 as gap 214) which may be detected by readout circuit 104 via leads 204, 210. As explained in more detail below, the measured capacitance may be related to sub-micron and/or nanoscale PMs in an environment such that a measurement or estimation of concentration of sub-micron and/or nanoscale PMs may be obtained from the detected capacitance of the interdigitated capacitive sensor 110.

In one particular implementation, the capacitive sensor 110 may be constructed to be integrated with a standard air sampling cassettes which use 25-37.5 mm filters. The sampling cassette allows the selection of sub-micron particles while rejecting larger particles with a mass median aerodynamic diameter (MMAD) of 3.8 µm. Further, the sensor strip may have a rectangular shape with dimensions of 2 mm×12 mm to minimize the air flow interference when integrated with the sampling cassette and to facilitate easy connection with the readout board. The interdigitated patterns may provide maximum sensitivity in a given area. In one particular implementation, the sensing area of the interdigitated capacitance sensor 110 may be a 1 mm (shown by arrow 216) by 1.5 mm (shown by arrow 218) sampling area. In addition, the width 220 of each of the interdigitated electrodes 206, 212 may, in one implementation, be 2 µm with spacing 214 between the electrodes being nominally between 2 µm to 3 µm. In general, width 220 of the electrodes 206, 212 and/or the spacing between the electrodes may be selected to capture particularly-sized particulates. Thus, to capture the presence of nanoparticles, the width 220 of the electrodes 206, 212 and/or the spacing between the electrodes may be as small as 10 nm and may be larger than 3 µm. Electrode widths and spacings between electrodes may thus be any length as desired. In one example, the spacing 214 between the electrodes 206, 212 may be chosen based on projected fabrication yield.

In general, the capacitance of interdigitated patterns may be calculated as sum of interior capacitances (CI) and exterior capacitances (CE), with multiplication of the number of electrodes where CI and CE are capacitances with respect to a ground plane in the halfway between two electrodes. In order to understand both the capacitance of the interdigitated sensor 110 (without particles) and the effects of particle loading, simulations may be performed with different electrode thickness and spacing and the deposited particle layer is represented by a uniform-thickness layer of dielectric. The result may then be normalized with respect to the entire sensor area.

Figure 3:
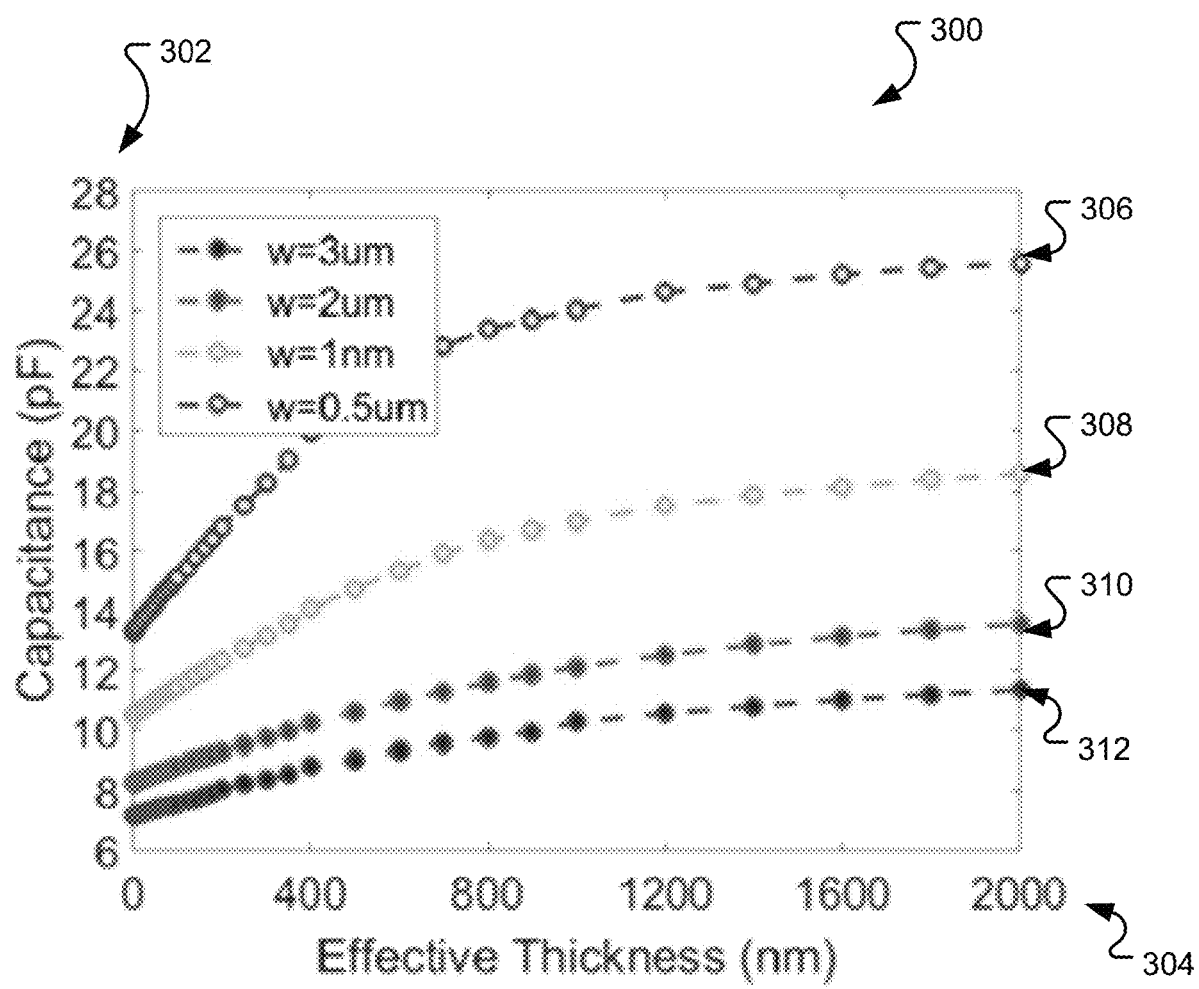
FIG. 3 is a graph illustrating the response of the interdigitated capacitive sensor 110 with different spacing of the electrodes in accordance with one embodiment.

FIG. 3 is a graph 300 illustrating the response of the interdigitated capacitive sensor 110 with different spacing between the electrodes in accordance with one implementation. In particular, the graph 300 illustrates measured capacitance 302 of the capacitive sensor 110 versus a thickness of the electrodes 304, ranging from 0 nm to 2000 nm. The plots for the different spacing illustrated include a width of 3 µm 312, 2 µm 310, 1 µm 308, and 0.5 µm 306. As shown, when there is no particle layer, the calculated capacitance may be approximately 8.37 pF for 2 µm spacing and 7.23 pF for 3 µm respectively. The capacitance may linearly increase with an increased particle layer thickness, with saturation beginning as the layer thickness exceeds 400 nm. The slope in the linear region represents the sensitivity which increases as the spacing is reduced. The results indicate that ΔC due to dielectric material is higher when particles are deposited in between electrodes. In general, there is a trade-off between electrode spacing and sensitivity; a capacitive sensor with narrower spacing between the electrodes may be most useful for smaller particle detection, but such a design may be inefficient for particles larger than the spacing as they will not be collected in between electrodes. Also, taller electrodes may be beneficial for extending the maximum capacity of sensor with a constant response, but inefficient particle collection may occur as taller electrodes may disturb airflow inside the sampler, which may disturb particle collection in between the sensor electrodes. With these constraints in mind, one particular implementation of the interdigitated capacitive sensor 110 may include an electrode width 220 of 2 μm and a spacing 214 between the electrodes of 2-3 μm, although other dimensions are contemplated for different types and sizes of PMs.

Returning to FIG. 1, the PM sensor 102 may also include a resistance-based micro-heater circuit 108 for maintaining the sensor at an elevated temperature. The micro-heater circuit 108 may mitigate the effects of condensation/water droplets on the PM sensor 102 and enhances the stability of the capacitance of the interdigitated capacitive sensor 110. In addition, direct integration of the micro-heater 108 on the sensor reduces the complexity of installing a heater inside a sampler. The serpentine pattern 222 is used in order to maximize the resistance (minimize the current) in the limited area of the sensor strip, with four electrodes enabling accurate temperature measurement. Further, while silicon substrate provides solid and high fabrication yields, such a substrate provides a high parasitic capacitance, potentially reducing the effect of capacitance change from the sensor 110. Thus, in one implementation, a polyimide material may be used as it has lower relative dielectric constant in comparison to silicon to minimize the parasitic capacitance from the substrate and improve the accuracy of the capacitive sensor 110. Batches of flexible sensor/heater strips may be fabricated through scalable microfabrication approaches for use in the real-time monitoring of PMs in an environment.

Figure 4:
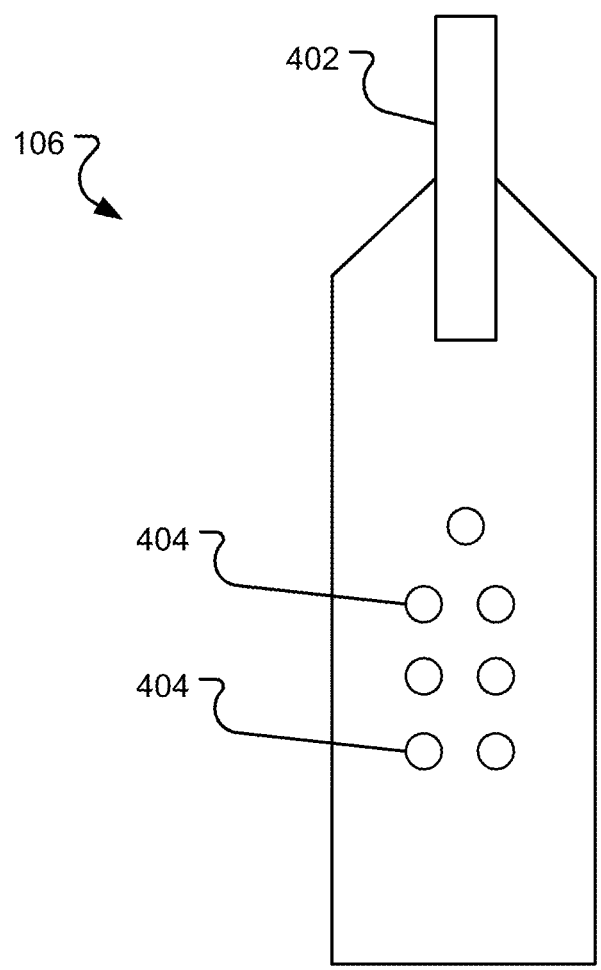
FIG. 4 illustrates an overhead view of an interface board for interconnecting the interdigitated capacitance sensor and/or micro-heater with a readout circuit in accordance with one embodiment.

To facilitate integration between the interdigitated capacitance sensor/micro-heater strip with the readout board 104, the PM sensor 102 may include an interface 106. In one implementation, the interface 106 may be a custom-made printed circuit board (PCB) that includes electrical connections between readout circuit 104 and the sensor/heater strip. The interface PCB 106 may enable robust electrical and mechanical connections to the readout board, via one or more pin header connections included in the interface. FIG. 4 illustrates an overhead view of an interface board 106 for interconnecting the interdigitated capacitance sensor 110 and/or micro-heater 108 with a readout circuit 104. In particular, the interface 106 may electrically connect a strip 402 including the electrical leads 204, 210 of the interdigitated capacitance sensor 110 and/or portions of the micro-heater 108 to a readout circuit 104 once the strip is mounted on the interface. One or more interface ports 404 may be located on the interface 106 for transmission of signals, measurements, data, etc. from the strip 402 to the readout circuit 104. In some instances, signals, data, and the like from the readout circuit 104 may be transmitted to the capacitive sensor 110 and/or the micro-heater 108 via the interface ports 404. The sensor 110 and micro-heater 108 may, in one implementation, be wire-bonded to the interface 106 using gold wires. Similar to the batch-fabricated sensor strip 402, the interface 106 can be disposed, as needed.

Figure 5A:
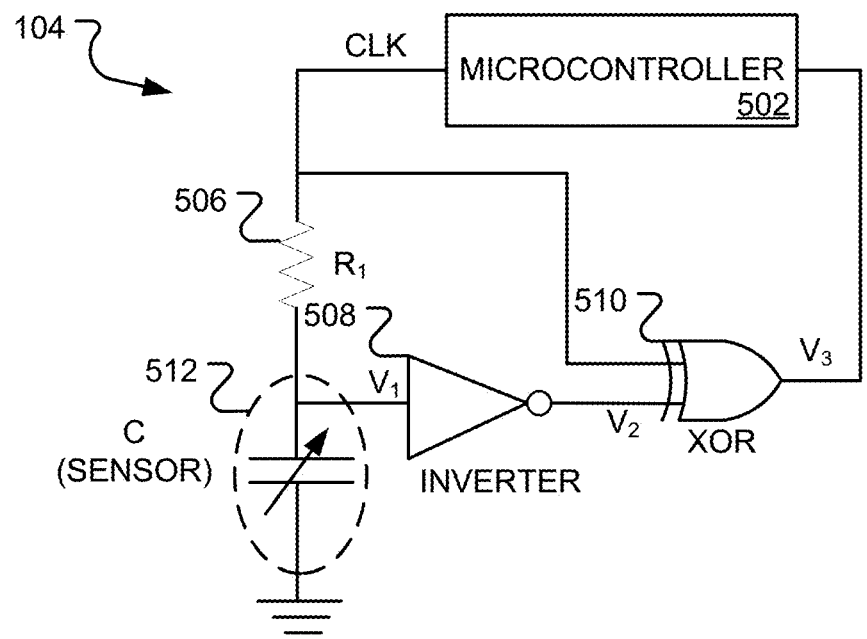
FIG. 5A is a circuit diagram of a readout circuit in communication with a capacitance sensor for measuring sub-micron and nanoscale particulate matters in an environment in accordance with one embodiment.
Figure 5B:
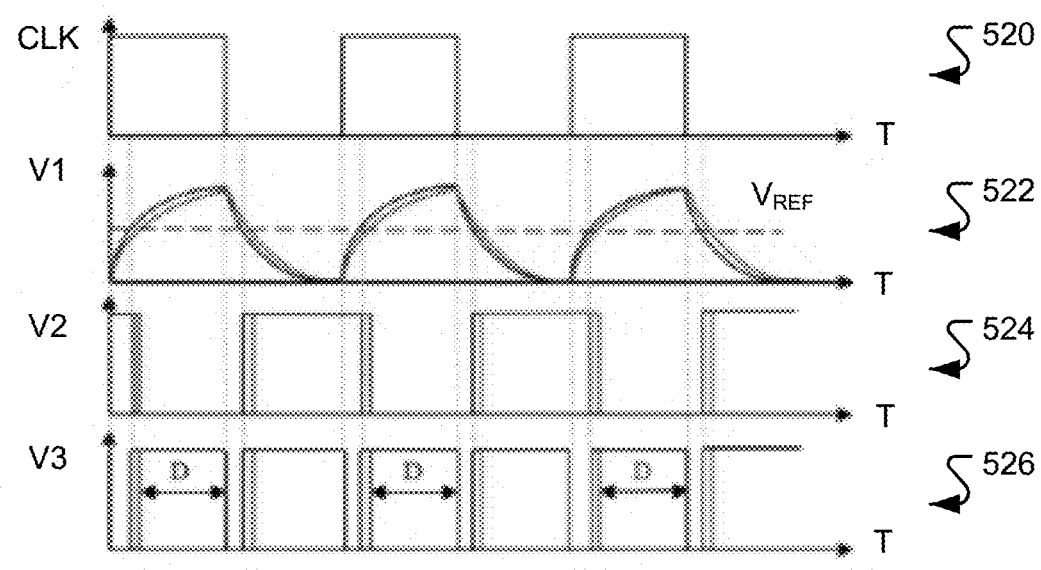
FIG. 5B illustrates voltage signals of nodes of the readout circuit of FIG. 5A in accordance with one embodiment.

FIG. 5A is a circuit diagram of a readout circuit in communication with a capacitance sensor for measuring sub-micron and nanoparticles in an environment in accordance with one embodiment. In general, the readout circuit 104 includes a microcontroller 502 in electrical communication and providing a clock signal to a first conductor of a resistor 506 and a first conductor of an exclusive OR gate 510. A second conductor of the resistor 506 is in electrical communication with the capacitance sensor 110 discussed above and an input to an inverter 508. The output of the inverter is connected to a second conductor of the exclusive OR gate 510, the output of which is provided back to the microcontroller 502. In general, the readout circuit 104 operates to measure the time constant of the capacitance sensor 110 and an external resistor 506. In particular, FIG. 5B illustrates voltage signals of nodes of the readout circuit of FIG. 5A in accordance with one embodiment. In particular, FIG. 5B illustrates the clock signal (CLK) 520, a voltage signal 522 at node $V_1$ (the input to the inverter 508), a voltage signal 524 at node $V_2$ (the output of the inverter 508), and a voltage signal 526 at node $V_3$ (the output of the exclusive OR (XOR) gate 510).

Figure 6:
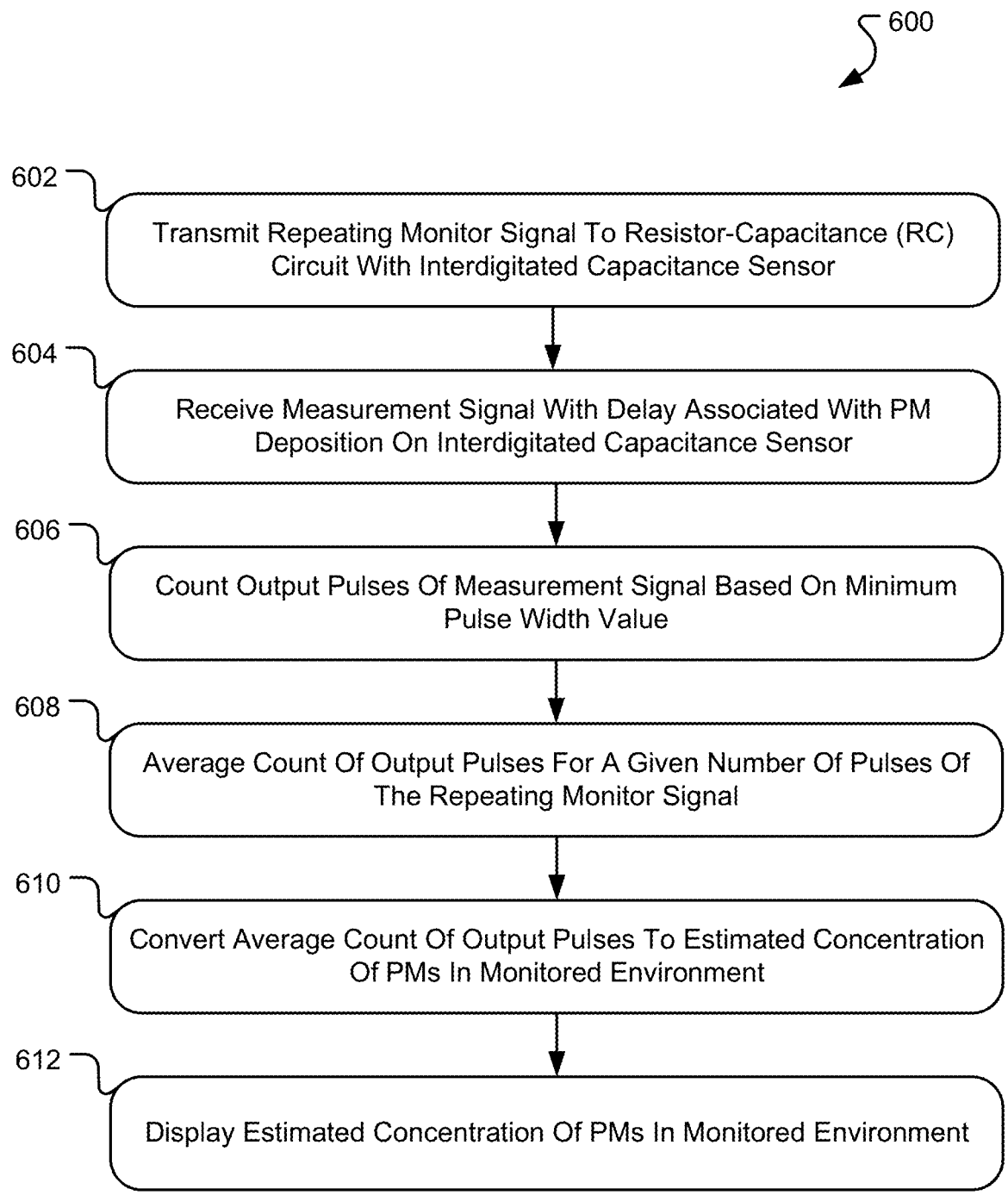
FIG. 6 is a flowchart of a method for measuring a relative capacitance of the interdigitated capacitance sensor 110 for real-time monitoring of sub-micron and nanoscale particulate matters in accordance with one embodiment.

FIG. 6 is a flowchart of an example method for measuring a relative capacitance of the interdigitated capacitance sensor 110 for real-time monitoring of sub-micron and nanoscale particulate matters in accordance with one embodiment. The operations of the method 600 may be performed or executed by the readout circuit 104 or any other computing or electrical component, such as the computing device described in greater detail below, of or associated with the PM sensor 102. The operations may be performed by one or more hardware components of the PM sensor 102 or other computing device, one or more programs executed by a hardware processor, or a combination of both hardware and software components. The operations are described herein as performed or executed at least partially by the microcontroller 502.

Beginning in operation 602, the microcontroller 502 may transmit a repeating monitor signal to a resistor-capacitance (RC) circuit in which the capacitance portion of the RC circuit is the interdigitated capacitance sensor 110. In one implementation, the monitor signal may be the clock signal (CLK) 520 discussed above. Thus, using the circuit of FIG. 5A as an example, the microcontroller 502 may transmit the clock signal 520 to resistor 506. In general, the clock signal 520 may include multiple, repeating pulses, as illustrated in the signal graph of FIG. 5B. One example of such a clock signal 520 may be a 100 Hz square wave signal with a 50% duty cycle, although other repeating signals may be used to monitor the capacitance sensor 110. The clock signal 520 is transmitted to the series-connected resistor 506 and capacitance sensor 512. This RC circuit acts on the clock signal 520 to generate voltage signal $V_1$ 522. In general, the slope of the $V_1$ signal 522 is dependent on the values of the resistance value of the resistor 506 and the capacitance of the capacitor sensor 512. The $V_1$ wave form 522 may be transmitted as an input to inverter 508 and transformed into a square wave signal (signal $V_2$ 522) after passing through the inverter. In particular, the inverter 508 may be associated with a reference voltage ($V_{REF}$), which may be provided to the inverter as an input. In one particular implementation, the $V_{REF}$ may have a value of 0.5 V, although any reference voltage value may be selected or otherwise provided to the inverter 508. The inverter 508 operates to output a high value when the input signal ($V_1$ 522) reaches or is less than the $V_{REF}$ value and to output a low value when the input signal is greater than the $V_{REF}$ value. The output signal $V_2$ of the inverter 508 is illustrated as signal 524 of FIG. 5B. The value of $V_{REF}$ is also illustrated in waveform 522 for reference.

The output signal 524 $V_2$ from the inverter 508 is transmitted to the XOR gate 510 for comparison with the initial clock signal 520 at the XOR gate. The XOR gate 510 operates to output a high value if either the input signal $V_2$ 524 or the clock signal 520 is high and to output a low if both the input signal $V_2$ and the clock signal are low, as illustrated in voltage signal $V_3$ 526. The output of the XOR 510 (signal $V_3$ 526) is fed back to the microcontroller 502 for comparison to the clock signal 520, as explained in more detail below.

In operation 604, the microcontroller 502 receives the voltage signal $V_3$ 526 as the measurement signal. In general, as the capacitance of the interdigitated capacitive sensor 110 increases due to particle deposition, a delay in the time constant delay of the RC circuit occurs (as shown in the red curve in signal $V_1$ 522). In other words, as the capacitance of the capacitor sensor 512 increases due to deposition of PMs, a delay in voltage signal $V_1$ 522 occurs. This delay propagates through the inverter 508 (illustrated as the red signal in voltage signal $V_2$ 524) and the XOR gate 510 (illustrated as the red signal in voltage signal $V_3$ 526). Further increase in the capacitance of the sensor 512 may cause a longer delay in the signal which is subsequently propagated through the circuit into measurement signal $V_3$ 526. This signal is then received at the microcontroller 502 for analysis.

In particular, the microcontroller 502 may, in operation 606, count a number of output pulses within the measurement signal based on a minimum pulse width value. In particular, the microcontroller 502 counts a number of output pulses of signal $V_3$ 526 following a rising edge of the clock signal and that last at least a minimum detectable pulse width duration of D. For example, as shown in voltage waveform 526, the microcontroller 502 may count the pulses indicated by the duration D in the voltage signal as these pulses follow the rising edge of a corresponding pulse of the clock signal 520 and have a high value for at least the duration D. In general, a counting interval may be set by the microcontroller 502, such as a counting interval of 1 microseconds (μS) or any other timeframe. Although in the illustrated example, only the "rise" pulses for the $V_3$ signal 526 may be chosen for counting, any trigger in the measurement signal 526 and/or the clock signal 520 may be selected. The microcontroller 502 may count the number of such pulses of the measurement signal $V_3$ 526 that occur in the counting interval. Further, in operation 608, the microcontroller 502 may average the number of counted pulses that are detected for a given number of pulses of the monitor signal, such as the clock signal 520. For example, the microcontroller 502 may count the number of qualifying output pulses of the measurement signal $V_3$ 526 that occur over 500 pulses of the clock signal 520.

In operation 610, the microcontroller 502 may then convert the averaged count of output pulses of the measurement signal $V_3$ 526 into a measurement of sub-micron and nanoscale particulate matters in an environment. In particular, as the deposition of sub-micron and nanoscale PMs on the capacitance sensor 512 increases, the delay (represented by the red line in the voltage signal graphs of FIG. 5B) may increase such that one or more output pulses of measurement signal $V_3$ 526 no longer has a duration above the minimum detectable pulse width D. As the delay in the measurement signal increases due to the build-up of PMs, fewer output pulses may be counted by the microcontroller 502 such that the calculated average may drop. The microcontroller 502 may correlate the determined average number of output pulses over the measurement period to an estimated concentration of PMs in the monitored environment. For example, the microcontroller 502 may store or have access to a database of correlated determined averages of output pulses over the measurement period to a concentration of sub-micron and nanoscale PMs in an environment, such as a look-up table maintaining such correlations. In another example, the microcontroller 502 may generate the estimated concentration of PMs in the monitored environment as a relative value to a baseline average number of output pulses over the measurement period. Regardless of the mechanism through which the estimated concentration of PMs in the monitored environment, an indication of such estimation may be displayed on a display device in operation 612. In one particular implementation, the readout circuit 104 may include a display, such as a LED display, that is controllable to display the estimated concentration of PMs. In some instances, the indication of the estimated PMs may include an auditory, visual, or tactile alert or alarm.

The effectiveness of the PM sensor 102 described herein has been verified through simulation and testing. In one particular example, a PM sensor 102 with an interdigitated capacitance sensor 110 with a sensing area of 1 mm by 1.5 mm, including electrodes 206, 212 with a width of 2 μm and a spacing 214 between the electrodes being nominally between 2 μm to 3 μm is tested. Initially, such a fabricated PM sensor 102 is calibrated. During calibration of PM sensors 102 with 2 μm-spacing between electrodes 206, 212, calibrated measured capacitances ranged from 11 to 12 pF and for PM sensors 102 with 3 μm-spacing between electrodes 206, 212, calibrated measured capacitances ranged from 7 to 8 pF. Comparing with the calculated nominal capacitances of 2 μm and 3 μm-spacing sensors, which are 8.37 pF and 7.23 pF respectively, the higher measured values should originate from the parasitic capacitance of the interface 106 as well as fabrication nonidealities. The PM sensor 102 sensitivity may be estimated by calculating the RC time constant (i) as a result of capacitance shift. That is $$V = V_0(1 - e^{-t/\tau}) \quad (1)$$

where $V_0$ is an initial voltage and t represents time. During simulation of the PM sensor 102 circuit, about 15 femtofarad (fF) of capacitance shift is required to delay 1 μs of rising time. As the readout circuit 104 itself has a fixed resistance and parasitic capacitance, a non-zero number of counts has been observed for zero sample capacitance. The results indicate that counting increases linearly with increasing capacitance. After calibration with fixed capacitors, fabricated PM sensors 102 were compared and the counting of two sensor chips (8.03 pF and 11.54 pF) matched well with a linearly extrapolated curve.

The use of the interdigitated capacitance sensor 110 to detect sub-micron and nanoscale PMs has been demonstrated with test dust, with the PM sensor 102 mounted in a sampler device. The outlet of the sampler may be connected to an air pump for constant air flow (0.3 L/min), and road dust may be sprayed periodically through the top opening of a test chamber to test the PM sensor 102. Since the dust consists primarily of silica, it was assumed that the dielectric constant of the test dust is same as that of silica, which is about 3.9.

Figure 7A:
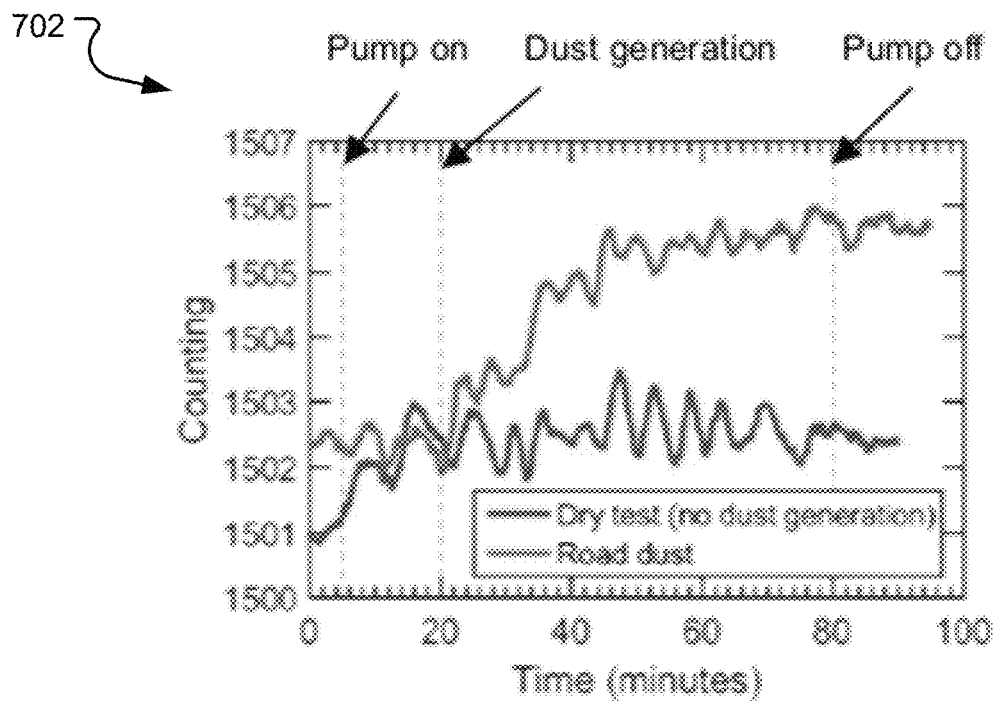
FIG. 7A illustrates a graph of a time-response of a particulate matters sensor during a road-dust test and an airflow test in accordance with one embodiment.

FIG. 7A illustrates a graph 702 of a time-response of a PM sensor 102 during two tests: one using road-dust and the other with the same airflow but without particles. In particular, an average of counted output pulses is graphed for the designated test time. At the beginning of each test, the stability of the PM sensor 102 was monitored via measurement during 5 minutes without airflow and 15 minutes of airflow without particles. After 60 minutes of tests, an additional 10 minutes of measurement without air flow was performed. While the PM sensor 102 was stable during dry test (no particles generated), a clear differential response was observed when particles are generated showing a counting shift of 3.24 counts. This indicates that the duration of output pulse changed by 3.24 µs as a result of capacitance change. The sub-integers of counts are the results of averaging as described above, as well as 2 minutes of window averaging from the recorded data.

Figure 7B:
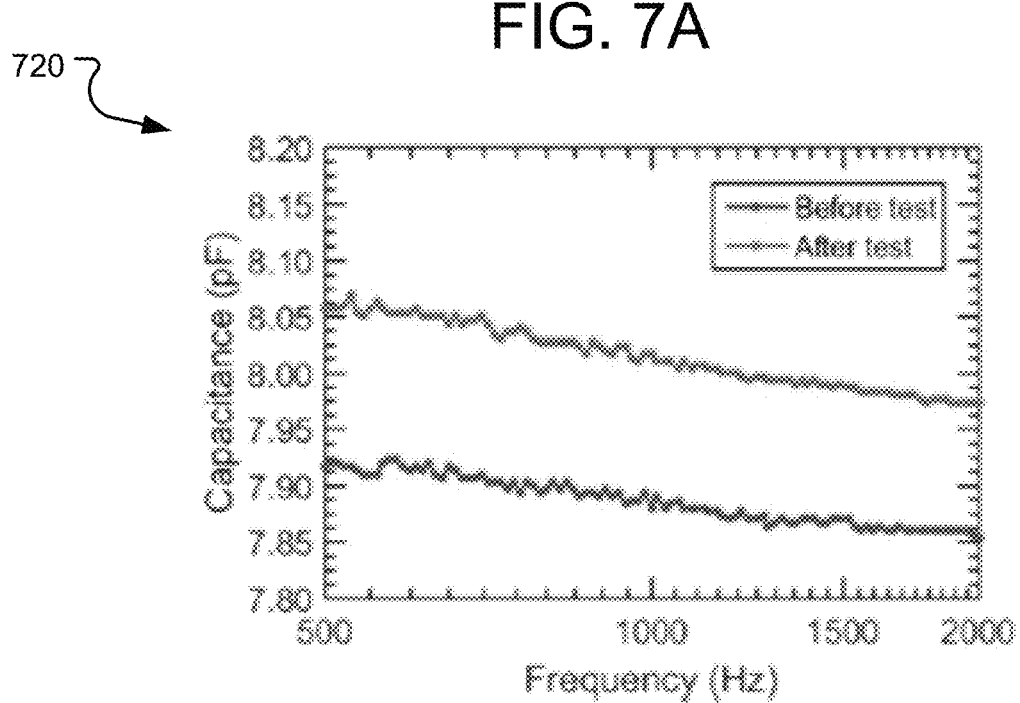
FIG. 7B illustrates a graph of measured capacitance versus frequency of the particulate matters sensor before and after the road dust illustrated in FIG. 7A in accordance with one embodiment.

FIG. 7B illustrates a graph of a frequency-response of the PM sensor 102 before and after the above test for comparison. The graph 720 illustrates an increase in sensor capacitance after testing, in agreement with positive shifts in counting from the readout circuit 104. The frequency dependence of capacitance is observed in the graph 720 from the sensor before and after test; the frequency-dependent dielectric constant of polyimide substrate could reduce the capacitance with increased frequency. The readout calibration using fixed capacitors estimated a resolution of ~15 fF/count, however, the calculated resolution from the test results using road dust appeared to be ~42 fF/count. One possibility is that the actual capacitance shifts due to particles could be masked under continuous air flow which causes dried condition, resulting the reduced capacitance shifts during tests.

The PM sensor 102 tested in the manner disclosed above was inspected with a scanning-electron microscope (SEM) for post-analysis. Through this analysis, it was determined that about 77% of particles on the PM sensor 102 are smaller than 1 µm while 23% are larger than 1 µm. Whereas most particles had sub-micrometer diameters, a few larger particles were observed; each of these is counted as a single particle due to a limited resolution. In order to estimate total volume of particles within each size range, particles are assumed as spheres with an average diameter ($D_{eff}$) corresponding to each bin. By summing the estimated volumes for all size ranges, the total volume of particles on the sensor is calculated to be $1.15 \times 10^4$ µm$^3$. Since the test dust mostly consists of silica, the density of silica (2.65 g/cm$^3$) is used for the calculation of the effective mass ($m_{eff}$). The calculated total $m_{eff}$ on the tested PM sensor 102 is $3 \times 10^{-8}$ g. The calculation indicates that the positive capacitive sensor response corresponds to the volume of particles collected on sensor. Although a large fraction of the overall particle count may come from sub-micron particles, the total volume of particulate material is dominated by the particles larger than 1 micron. The volume fraction of each particle size range may thus correlate to the relative contribution to capacitance response. It is noted that a nucleation of particles after landing on sensor could result such agglomerations.

To understand the sensor sensitivity with volume, the calculated volume may be compared with simulation results. The total volume may be converted into effective thickness ($T_{eff}$), i.e. the thickness of a uniform thin film containing the same volume of material. Assuming the material is uniformly deposited over the sensing area of the tested PM sensor 102 (1 mm×1.5 mm), the $T_{eff}$ is estimated to be ~8 nm. This $T_{eff}$ may then compared with a simulation result. Since the effective thickness of the tested sensor is about 8 nm, sensor response is in the regime where the dielectric change is linearly proportional to the volume of each particle. While the fractional change in capacitance (ΔC/C) from experiment is about 1.7%, that from simulation becomes 0.6% with 8 nm of increase in $T_{eff}$. As such, the comparison using ΔC/C still shows that the PM sensor 102 response is in the linear regime.

Figure 8:
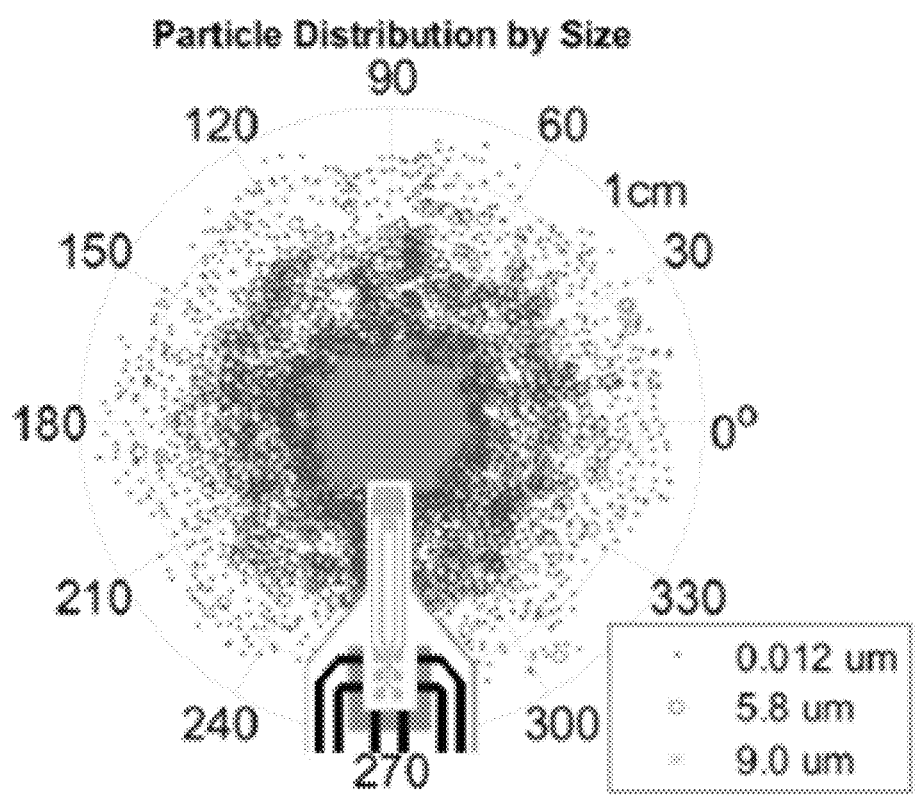
FIG. 8 is an illustration of radial distribution of particles within a sampling cassette about a PM sensor in accordance with one embodiment.

A simulation study using a computational fluid dynamic program indicates that particle distribution inside a sampling cassette depends on the particle size; particles smaller than 3 gm are uniformly distributed over the filter area, while particles larger than 3 gm are concentrated in the center area. FIG. 8 is an illustration of radial distribution of particles within a sampling cassette about a PM sensor in accordance with one embodiment. The illustration 800 provides simulation results with three representative particles; while particles of 11.5 nm-diameter (red) is uniformly distributed, both 5.8 um-diameter (blue) and 9.0 um-diameter (green) are collected preferably in the center. The PM sensor 102 in this simulation is located about 2.5 mm away from the center. According to the simulation result, the PM sensor 102 rejects most of particles larger than 9 gm while some of 5 gm-diameter particles may land on the sensor. Therefore, placing the sensor away from the center increases the probability of accepting sub-micron particles, rather than microparticles.

With all given information, we can convert our results into the standard particle concentration expression; g/m$^3$. Using chain rule, $$\frac{\text{mass(g)}}{\text{Volume(m}^3)} = \frac{\text{Count}}{\text{min}} X \left( \frac{\text{mass(g)}}{\text{Count}} X \frac{1}{\text{Flow rate}(L/\text{min})} XC \right) \quad (2)$$

where C is the mass calibration factor. The C represents the ratio of particle mass on filter to particle mass on sensor, which are obtained by gravimetric method and post-analysis, respectively. While the terms in the parenthesis are known, only the rate of change in count will vary with respect to the environment. For instance, the rate of change may be about 1 count/10 minutes for the first 30 minutes. Therefore, $$4.11 \frac{\text{mg}}{m^3} = \frac{1 \text{ Count}}{10 \text{ min}} X \left( \frac{3.04 \times 10^{-8}(g)}{3.24 \text{ Count}} X \frac{1}{0.3(L/\text{min})} X \frac{10^3 L}{m^3} X 1316 \right) \quad (3)$$

The calculation result shows that under the given test conditions using road dust, the particle concentration is ~4 mg/m$^3$ for 10 minutes of sampling. On the other hand, the rate decreases after 30 minutes of particle sampling with the ratio of 0.33 count/10 minutes. That is, $$1.36 \frac{\text{mg}}{m^3} = \frac{0.33 \text{ Count}}{10 \text{ min}} X \left( \frac{3.04 \times 10^{-8}(g)}{3.24 \text{ Count}} X \frac{1}{0.3(L/\text{min})} X \frac{10^3 L}{m^3} X 1316 \right) \quad (4)$$

By monitoring the rate of change in counts, the airborne particle concentration can be calculated at intervals on the order of 10-20 minutes.

Therefore, an interdigitated capacitive sensor 110 is made for sub-micron and nanoscale particulate matters detection in an environment. The batch-fabricated sensor strip may be designed for the integration with personal sampling cassettes and a readout circuit 104 may enable continuous monitoring of capacitance shifts due to particles. Sensor response with respect to test dust showed differential behavior from tests without dust and good agreement with positive capacitance shift. Most of the collected particles appeared to be sub-micrometer sized particles with diameter below 1 μm, and micrometer sized particles are agglomerates of smaller particles. A simulation study showed that the PM sensor 102 response is linearly proportional to the volume of collected particles. The particle mass on sensor 102 with the consideration of radial dependence of particle deposition and sensor location can estimate the total mass concentration of deposited particles. An incorporated heater improved stable capacitance sensor reading by mitigating variations from surroundings such as air flow and relative humidity. Finally, the sensor response is converted into a standard airborne particle concentration (g/m$^3$) demonstrating an example of continuous particle monitoring. This disposable and real-time particle sensing device 102 could be integrated with standard personal sampling cassettes and utilized for workers in the mining environmental and other diverse workplaces who are exposed to hazardous sub-micrometer and nanometer-sized particles.

Figure 9:
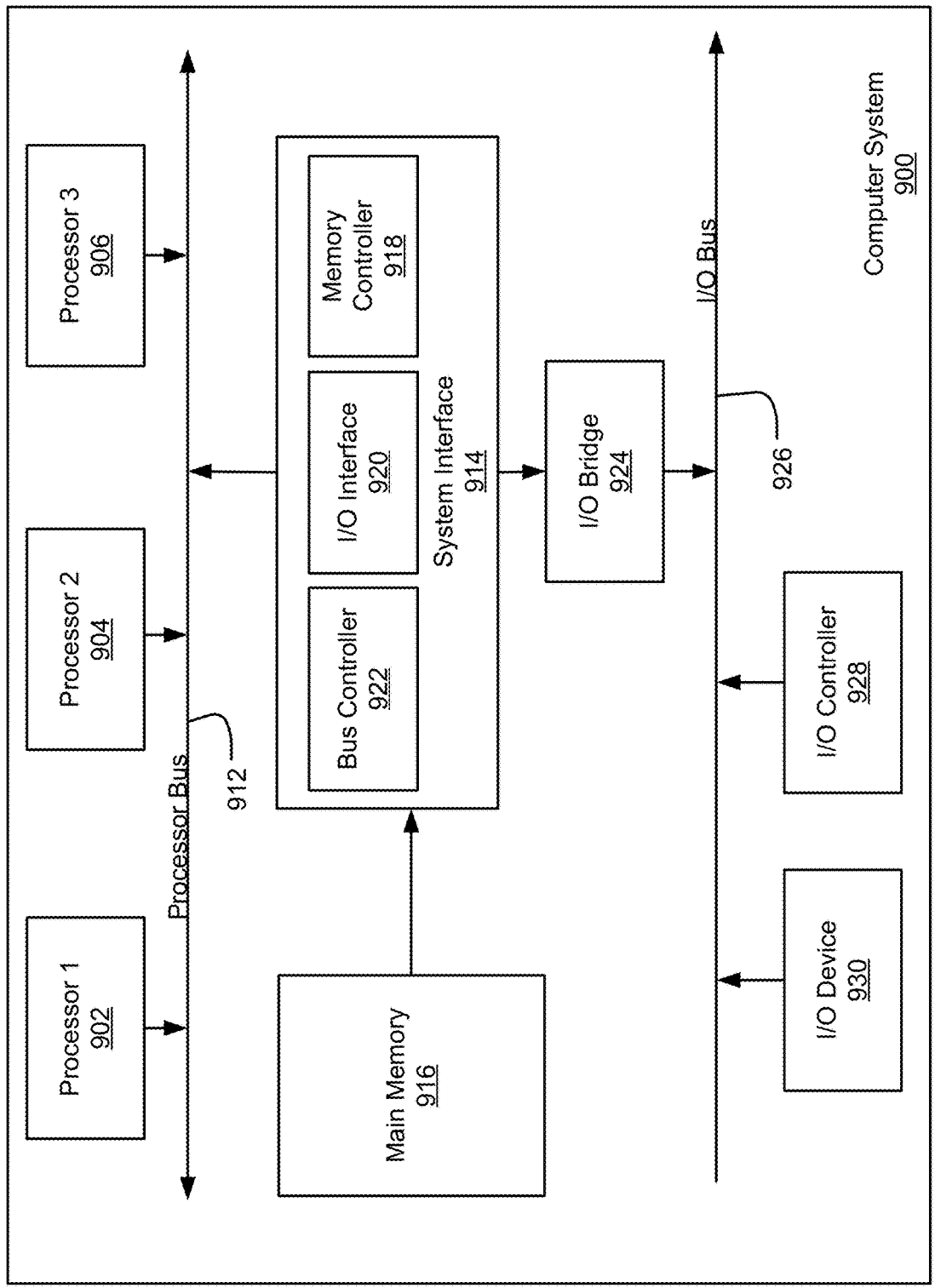
FIG. 9 is a diagram illustrating an example of a computing system which may be used in implementing embodiments of the present disclosure.

FIG. 9 is a block diagram illustrating an example of a computing device or computer system 900 which may be used in implementing the embodiments of the components of the network disclosed above. For example, the computing system 900 of FIG. 9 may perform one or more operations of the method 600 of FIG. 6 discussed above. The computer system (system) includes one or more processors 902-906. Processors 902-906 may include one or more internal levels of cache (not shown) and a bus controller or bus interface unit to direct interaction with the processor bus 912. Processor bus 912, also known as the host bus or the front side bus, may be used to couple the processors 902-906 with the system interface 914. System interface 914 may be connected to the processor bus 912 to interface other components of the system 900 with the processor bus 912. For example, system interface 914 may include a memory controller 914 for interfacing a main memory 916 with the processor bus 912. The main memory 916 typically includes one or more memory cards and a control circuit (not shown). System interface 914 may also include an input/output (I/O) interface 920 to interface one or more I/O bridges or I/O devices with the processor bus 912. One or more I/O controllers and/or I/O devices may be connected with the I/O bus 926, such as I/O controller 928 and I/O device 930, as illustrated.

I/O device 930 may also include an input device (not shown), such as an alphanumeric input device, including alphanumeric and other keys for communicating information and/or command selections to the processors 902-906. Another type of user input device includes cursor control, such as a mouse, a trackball, or cursor direction keys for communicating direction information and command selections to the processors 902-906 and for controlling cursor movement on the display device.

System 900 may include a dynamic storage device, referred to as main memory 916, or a random access memory (RAM) or other computer-readable devices coupled to the processor bus 912 for storing information and instructions to be executed by the processors 902-906. Main memory 916 also may be used for storing temporary variables or other intermediate information during execution of instructions by the processors 902-906. System 900 may include a read only memory (ROM) and/or other static storage device coupled to the processor bus 912 for storing static information and instructions for the processors 902-906. The system set forth in FIG. 9 is but one possible example of a computer system that may employ or be configured in accordance with aspects of the present disclosure.

According to one embodiment, the above techniques may be performed by computer system 900 in response to processor 904 executing one or more sequences of one or more instructions contained in main memory 916. These instructions may be read into main memory 916 from another machine-readable medium, such as a storage device. Execution of the sequences of instructions contained in main memory 916 may cause processors 902-906 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 916, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

We claim:

1. A particulate matters sensing device comprising:
    a sensor cartridge comprising:
        an interdigitated capacitance sensor comprising a plurality of interdigitated electrodes, each of the plurality of interdigitated electrodes separated from another of the plurality of interdigitated electrodes by a spacing, wherein sub-micron or nanoscale particular matters (PMs) of an environment are deposited within the spacing; and
    a readout circuit comprising:
        a processor; and
        a tangible storage medium encoded with instructions that are executed by the processor to perform operations comprising:
            receiving, from a monitoring circuit, a measurement signal comprising a delay of a monitoring signal;
            comparing the measurement signal to the monitoring signal to determine the capacitance of the interdigitated capacitance sensor;
            correlating the capacitance of the interdigitated capacitance sensor to a concentration of the deposited sub-micron or nanoscale PMs of the environment; and
            displaying an indication of the concentration of the deposited sub-micron or nanoscale PMs of the environment.

2. The particulate matters sensing device of claim 1 wherein the sensor cartridge further comprises a micro-heater circuit generating heat for the sensor cartridge.

3. The particulate matters sensing device of claim 1 wherein the readout circuit further comprises a display device, the instructions further executed to perform the operation of:
    displaying the indication of the concentration of the deposited sub-micron or nanoscale PMs of the environment on the display device.

4. The particulate matters sensing device of claim 1 wherein the readout circuit further comprises a wireless communication unit receiving the indication of the concentration of the deposited sub-micron or nanoscale PMs of the environment and transmitting the indication via the wireless communication unit.

5. The particulate matters sensing device of claim 1 wherein a width of at least one of the plurality of electrodes is between 10 nm to 3 µm and a width of the spacing is between 10 nm to 3 µm.

6. The particulate matters sensing device of claim 1 wherein the sensor cartridge further comprises a flexible, printed circuit board comprising a first conductive path electrically connected to a first portion of the plurality of interdigitated electrodes and a second conductive path electrically connected to a second portion of the plurality of interdigitated electrodes.

7. The particulate matters sensing device of claim 1 wherein the sensor cartridge further comprises the monitoring circuit comprising a resistor connected in series with the interdigitated capacitance sensor, the resistor and interdigitated capacitance sensor comprising a resistor-capacitor (RC) circuit.

8. The particulate matters sensing device of claim 7 wherein the instructions are further executed to perform the operation of:
    transmitting the monitoring signal to the RC circuit, the RC circuit providing an output signal comprising the delay of the monitoring signal, the delay corresponding to the capacitance of the interdigitated capacitance sensor of the RC circuit.

9. The particulate matters sensing device of claim 1 the indication of the concentration of the deposited sub-micron or nanoscale PMs of the environment comprises at least one of an auditory alarm, a tactile alarm, or a visual alarm.

10. A method for monitoring particulate matters of an environment, the method comprising:
locating a sensor cartridge in a sampling cassette, the sensor cartridge comprising an interdigitated capacitance sensor comprising a plurality of interdigitated electrodes, each of the plurality of interdigitated electrodes separated from another of the plurality of interdigitated electrodes by a spacing;
determining, at a monitoring circuit, a delay of a monitor signal indicating a capacitance of the interdigitated capacitance sensor, the capacitance corresponding to a concentration of deposited sub-micron or nanoscale PMs of the environment on the spacing of the interdigitated capacitance sensor; and
displaying, on a display device, an indication of the concentration of the deposited sub-micron or nanoscale PMs of the environment on the spacing of the interdigitated capacitance sensor.

11. The method of claim 10 wherein the sensor cartridge further comprises a resistor connected in series with the interdigitated capacitance sensor, the resistor and interdigitated capacitance sensor comprising a resistor-capacitor (RC) circuit, the method further comprising: transmitting a monitor signal to the RC circuit.

12. The method of claim 11 further comprising:
receiving a measurement signal comprising the delay of the monitor signal, the delay corresponding to the capacitance of the interdigitated capacitance sensor.

13. The method of claim 12 further comprising:
determining a number of output pulses of the measurement signal with a duration equal to or more than a minimum duration value.

14. The method of claim 13 further comprising:
correlating the number of output pulses of the measurement signal to the concentration of deposited sub-micron or nanoscale PMs of the environment on the spacing of the interdigitated capacitance sensor.

15. The method of claim 14 wherein correlating the number of output pulses of the measurement signal to the concentration of deposited sub-micron or nanoscale PMs of the environment comprises accessing a look-up table from a memory device.

16. The method of claim 12 further comprising:
comparing an output signal of an inverter of the monitoring circuit to the monitoring circuit to generate the measurement signal comprising the delay of the monitor signal.

17. The method of claim 10 further comprising: transmitting, via a wireless transmitter, the indication of the concentration of the deposited sub-micron or nanoscale PMs of the environment.

18. The method of claim 10 wherein the sensor cartridge further comprises a micro-heater circuit generating heat for the sensor cartridge.

19. The method of claim 10 wherein a width of at least one of the plurality of electrodes is between 10 nm to 3 μm and a width of the spacing is between 10 nm to 3 μm.

* * * * *